United States Patent
Speasl et al.

(10) Patent No.: US 11,095,538 B2
(45) Date of Patent: Aug. 17, 2021

(54) SYNCHRONIZATION OF DATA COLLECTED BY INTERNET OF THINGS (IOT) DEVICES

(71) Applicant: ImageKeeper LLC, Las Vegas, NV (US)

(72) Inventors: Jerry Speasl, Las Vegas, NV (US); Mike Patterson, Sherman, TX (US); Marc Roberts, St. Louis, MO (US)

(73) Assignee: IMAGEKEEPER LLC, Las Vegas, NV (US)

( * ) Notice: Subject to any disclaimer, the term of this patent is extended or adjusted under 35 U.S.C. 154(b) by 111 days.

(21) Appl. No.: 16/264,090

(22) Filed: Jan. 31, 2019

(65) Prior Publication Data

US 2019/0238433 A1    Aug. 1, 2019

Related U.S. Application Data

(60) Provisional application No. 62/624,727, filed on Jan. 31, 2018.

(51) Int. Cl.
| | | |
|---|---|---|
| *G06F 15/173* | (2006.01) | |
| *H04L 12/26* | (2006.01) | |
| *H04L 29/08* | (2006.01) | |
| *H04L 12/24* | (2006.01) | |

(52) U.S. Cl.
CPC .......... *H04L 43/06* (2013.01); *H04L 41/0631* (2013.01); *H04L 41/0893* (2013.01); *H04L 43/04* (2013.01); *H04L 43/08* (2013.01); *H04L 67/1095* (2013.01)

(58) Field of Classification Search
CPC . H04L 41/0631; H04L 41/0893; H04L 43/04; H04L 43/08; H04L 67/1095
USPC ......................................................... 709/223
See application file for complete search history.

(56) References Cited

U.S. PATENT DOCUMENTS

| | | | | |
|---|---|---|---|---|
| 2002/0181392 A1* | 12/2002 | Okuno | ................ | H04J 14/0283 370/216 |
| 2004/0073678 A1* | 4/2004 | Border | .................. | H04L 45/306 709/227 |
| 2008/0201076 A1* | 8/2008 | Huang | ................... | G01C 21/00 701/469 |
| 2009/0172201 A1* | 7/2009 | Carmel | ................. | H04L 67/104 709/248 |
| 2015/0318015 A1* | 11/2015 | Bose | ..................... | A63F 13/212 386/248 |

(Continued)

*Primary Examiner* — Imad Hussain
(74) *Attorney, Agent, or Firm* — Polsinelli LLP

(57) ABSTRACT

The present disclosure is directed to apparatus and methods that collect sensed data and that may organize that data such that it can be accessed by user devices or that can be organized and analyzed according to rules, conventions, or policies. Data collected by sensors or devices may be transmitted to a computer or server that stores that data. That stored data may then be analyzed to identify trends, events, or a chain of related events. In certain instances, an analysis of sets of raw data may result in the generation of a report or may result in alerts being sent to particular user devices. These sets of collected data, generated reports, and alert information may be stored and synchronized at one or more computing devices as data sets associated with a group of user devices or with a group of sensing devices.

22 Claims, 8 Drawing Sheets

(56) References Cited

U.S. PATENT DOCUMENTS

| | | | |
|---|---|---|---|
| 2016/0026729 A1* | 1/2016 | Gil | H04W 12/128 |
| | | | 726/23 |
| 2016/0028605 A1* | 1/2016 | Gil | H04W 4/38 |
| | | | 709/213 |
| 2016/0164890 A1* | 6/2016 | Haugsnes | G06F 16/24575 |
| | | | 726/23 |
| 2016/0352838 A1* | 12/2016 | Larkin | H04L 65/1006 |
| 2017/0041296 A1* | 2/2017 | Ford | H04W 12/06 |
| 2018/0034824 A1* | 2/2018 | Maycotte | G06F 21/6218 |
| 2019/0035242 A1* | 1/2019 | Vazirani | G08B 15/00 |
| 2019/0227880 A1* | 7/2019 | Tkaczyk-Walczak | |
| | | | G06F 16/178 |

* cited by examiner

SYNCHRONIZATION OF DATA COLLECTED BY INTERNET OF THINGS (IOT) DEVICES

CROSS REFERENCE TO RELATED APPLICATIONS

This application claims the priority benefit of U.S. provisional application No. 62/624,727, filed on Jan. 31, 2018, the disclosure of which is incorporated by reference herein.

BACKGROUND OF THE INVENTION

1. Field of Invention

The present invention generally relates to communicating with different electronic devices. More specifically, the present invention relates to implementing functions based on data received by different electronic devices in an Internet of Things (IOT) system.

2. Description of the Related Art

Presently available electronic devices may be capable of gathering data and sending that collected data to a centralized device. For example, a sensor data regarding a status of a security door (e.g., open or closed) may be sent to an alarm system when sensor data indicates that the door is open when it should not be (e.g., in accordance with a security policy regarding authorized open and close times). In such an centralized device may issue an alarm indicating that the door is open when it should be closed.

One evolving trend in electronic device technologies is the ability for electronic devices to communicate and record/synchronize events with each other using established and new protocols. This trend has led to the beginning of the development of standard protocols for electronic devices to communicate (by means that are now referred to as internet of things (IOT) protocols). Such protocols may include yet are not limited to low power wireless personal networks (6LoWPAN), the nano-Internet protocol (NanoIP), message queuing telemetry transport (MQTT) protocol, or the constrained application protocol (CoAP). The development of such protocols may allow heterogeneous or homogeneous electronic devices to communicate in new ways adapted to capabilities included in new sensors. Further, IOT computing devices and other computing devices may be able to perform new functions via new methods that decentralize communication and control. As such, in the future, the collection, processing, analysis reporting and distribution of data may become more intelligent, raising capabilities provided by different and disparate computing devices to a higher level than what is available today. Another evolving trend relates to storing information in storage devices accessible via the Internet or what is commonly referred to as 'cloud storage' that may be implemented by one more computing devices associated with a 'cloud' computing system.

Examples of IOT devices include, yet are not limited to smart digital devices, smartphones, tablets, mobile computers, smart video/image system, media integrated doorbell systems, factory, warehouse, postal imaging systems, web cameras, refrigerators, home appliances, tools, motors, electrical sub panel, electrical meter, solar monitoring and control systems, hands-free voice-controlled devices such as Alexa, aerial drones, digital cameras, appliances, factory machines, machine to machine, aircraft, ships, trains, farm equipment, autonomous automobile, solar generation systems, power management, smart home controllers, smart thermostats, home automation, home security, televisions, ground based and underwater drones, cable modems, garage door systems, entertainment systems, alarm systems, sensors, meters, actuators, healthcare, clothing sensors, clothing sensors sending data to medical centers, medical devices, insurance claims systems, telepresence devices, surveillance systems, web-based meeting and other collaboration systems, computers, or embedded computers hosting controls for singular or multiple capture IOT devices.

Many of the new sensors and apparatus available today, however, are not configured to interact with each other or to provide data in a form that specific electronic devices can easily evaluate or process. This means that data collected by such new sensors and apparatus are not accessible to users through the use of a single user interface or application program, thereby, requiring users to download and familiarize themselves with a variety of different control applications with different user interfaces. Such variety further complicates the ability to provide a coordinated response among multiple IOT devices (e.g., from different manufacturers). What are needed are new methods and apparatus that allow user devices to access information from different devices via an easy-to-user interface or application program.

SUMMARY OF THE CLAIMED INVENTION

The presently claimed invention relates to a method, a non-transitory computer readable storage medium, or a system/apparatus executing functions consistent with the present disclosure for collecting information from electronic devices. A method consistent with the present disclosure may store data sets received from each of a group of electronic devices with information that identifies specific electronic devices that provided portions of the data stored in a dataset. The method may also send operational program code to the group of electronic devices, receive communications indicative of an event from a particular electronic device, and initiate an analysis based on a received communication. This analysis may use sensor and media data associated with the event. After the analysis has been performed, a function may be triggered that may cause the analysis results to be provided to other electronic devices in the group of electronic devices.

When the presently claimed invention is implemented as a non-transitory computer readable storage medium, a processor executing instructions out of a memory may perform the method. Here again the method may store data sets received from each of a group of electronic devices with information that identifies specific electronic devices that provided portions of the data stored in a dataset. The method may also send operational program code to the group of electronic devices, receive communications indicative of an event from a particular electronic device, and initiate an analysis based on a received communication. This analysis may use sensor and media data associated with the event. After the analysis has been performed, a function may be triggered that may cause the analysis results to be provided to other electronic devices in the group of electronic devices.

When the presently claimed invention is implemented as a as a system that system may include a plurality of electronic devices that may also store data sets received from each of a group of electronic devices. Such stored information may identify specific electronic devices that provided portions of the data stored in particular datasets. The method may also send operational program code to the group of electronic devices, receive communications indicative of an event from a particular electronic device, and initiate an analysis based on a received communication. This analysis may use sensor and media data associated with the event. After the analysis has been performed, a function may be triggered that may cause the analysis results to be provided to other electronic devices in the group of electronic devices.

DETAILED DESCRIPTION

The present disclosure is directed to apparatus and methods that collect sensed data and that may organize that data such that it can be accessed by user devices or that can be organized and analyzed according to rules, conventions, or policies. Data collected by sensors or devices may be transmitted to a computer or server that stores that data. That stored data may then be analyzed to identify trends, events, or a chain of related events. In certain instances, an analysis of sets of raw data may result in the generation of a report, may result in triggering actions, or may cause alerts to be sent to particular user devices. These sets of collected data, generated reports, and alert information may be stored at one or more computing devices as data sets associated with a group of user devices or with a group of sensing devices. Rules, conventions, or policies may be generated and/or modified based on input from administrators or by users that interact with a user interface.

Figure 1:
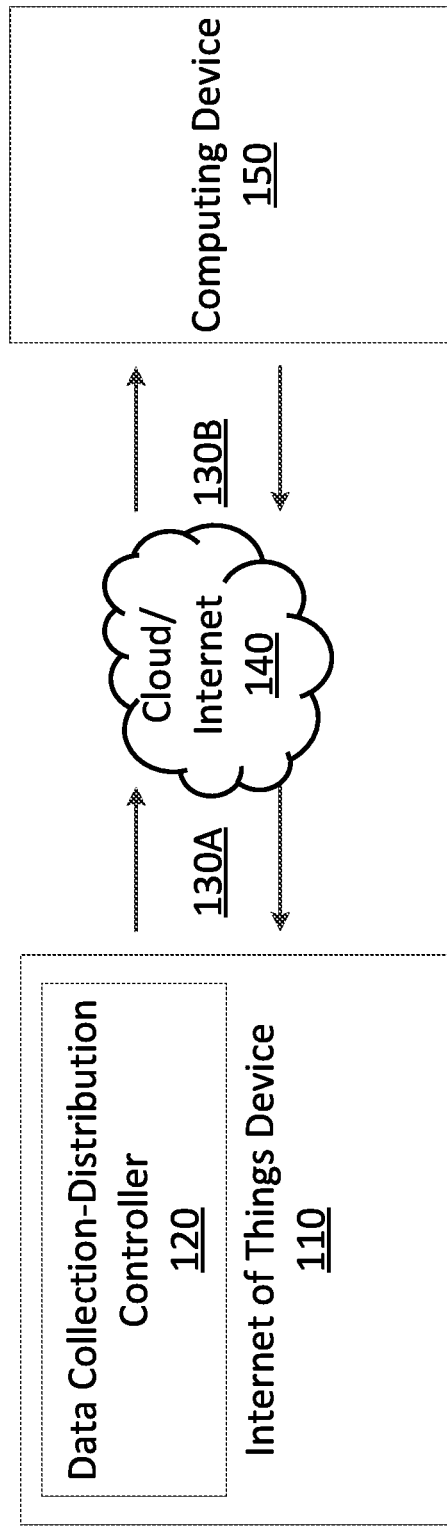
FIG. 1 illustrates an exemplary network environment in which a system for electronic device communication and synchronization of data via the cloud or Internet may be implemented.

FIG. 1 illustrates an exemplary network environment in which a system for electronic device communication and synchronization of data via the cloud or Internet may be implemented. FIG. 1 includes an internet of things (JOT) device 110 that includes data collection-distribution controller 120 that may collect data from sensors or electronic devices and share/synchronize that collected data with computing device 150 via the cloud or Internet 140 using communication channels 130A and 130B. Functionality consistent with data collection-distribution controller 120 may be implemented partially or entirely by a processor executing instructions out of a memory, in firmware, as a state machine, in a software application program, in an application specific integrated circuit (ASIC), or in a field programmable gate array (FPGA). Note also that computing device 150 may include or be associated with any form of computing or sensing device that collects information. As such, methods and apparatus consistent with the present disclosure are not limited to an JOT environment, where devices typically communicate over short distances using one or more JOT protocols. Alternatively or additionally, methods and apparatus consistent with the present disclosure may include collecting data from devices through proprietary communication mechanisms.

Communications 130A may be sent to or via the cloud from IOT device 110 according to settings, policies, or rules that control the collection and distribution of data by data collection-distribution controller 120. Communications sent via communication channels 130A and 130B may include updating operating constraints, settings, policies, or rules associated with data collection-distribution controller 120. Updates to the data collection-distribution controller 120 may be provided by computing devices in the cloud 140 or may be provided by computing device 150.

Computing device 150 may be any computing device known in the art. In certain instances computing device 150 may communicate with IOT device 110 using standard or proprietary protocols known in the art, including protocols associated with transmitting IOT data or for configuring IOT devices. In certain instances, computing device 150 shares data with IOT device 110 or with the cloud 140 via one or more wireless communication channels. As such, communication channels 130A or 130B may be wired or wireless communication channels. Computing device 150 may be a controller that controls actions performed by other IOT devices or be a user device that can receive IOT device or other data. Such a user device may receive reports, analysis, commands or results that have been generated according to methods consistent with the present disclosure. Alternatively or additionally, a user device may analyze the data received from one or more IOT devices. While FIG. 1 illustrates electronic devices communicating via the cloud or internet, electronic devices consistent with the present disclosure may also communicate with each other via a local wireless network or wired connection, including yet not limited to a 802.11/WI-FI network, a Bluetooth network, USB connections, Ethernet, cellular link, with secure, encrypted, or other wired or wireless connections.

Figure 2:
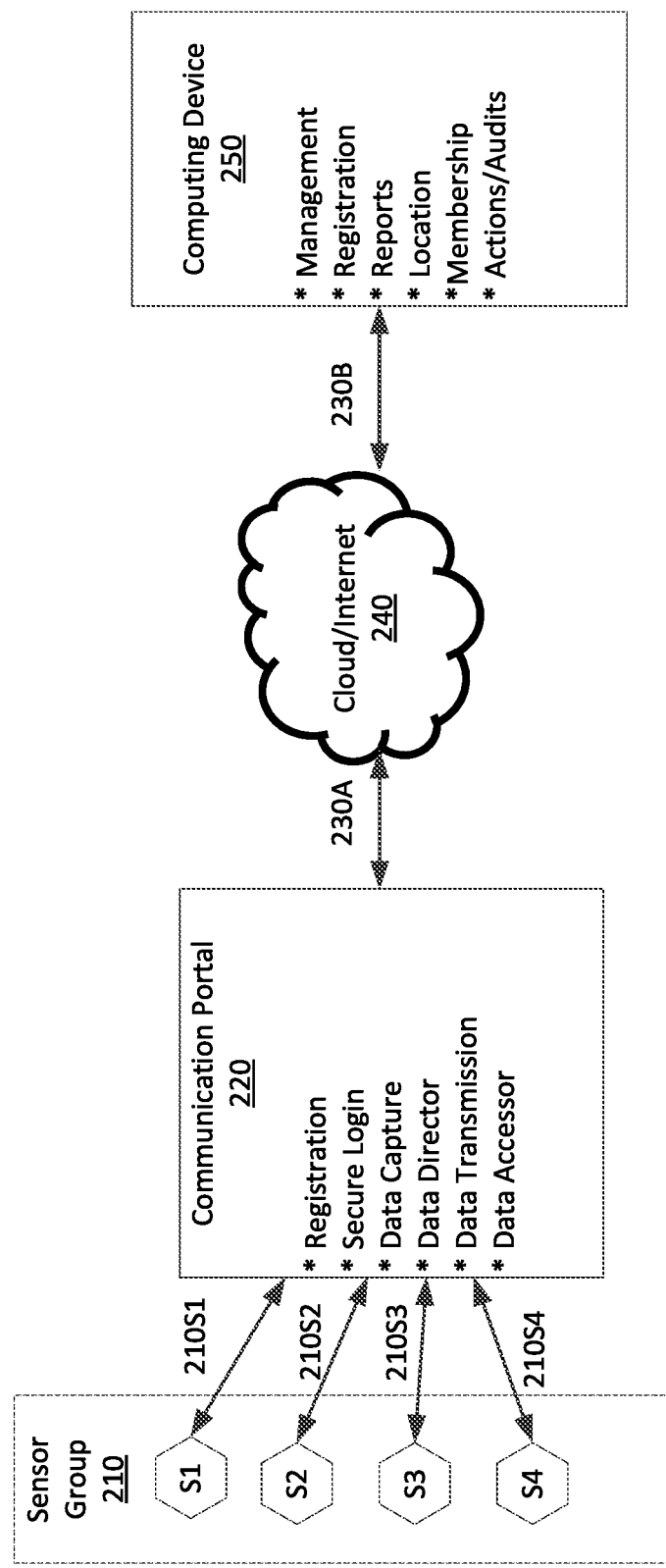
FIG. 2 illustrates exemplary diagrams of electronic devices that collect and share data via various different communication channels.

FIG. 2 illustrates exemplary diagrams of electronic devices that collect and share data via various different communication channels. FIG. 2 includes a set of sensors S1, S2, S3, and S4 (S1-S4) of sensor group 210, communication portal 220, cloud or Internet 240, and computing device 250. Computing device 250 may be a computer of a datacenter, a computer or telecommunication/cellular system associated with a cloud computing environment, or be a server administrated by a service provider. Computing device 250 may include software used to manage the collection and storage of data sensed by sensors S1-S4. Computing device 250 may also register or configure sensors S1-S4 or communication portal 220, generate reports from sensed data, perform or initiate actions associated with received information, or audit received data for anomalies. Computing device 250 may also store data in sets associated with particular locations or with particular membership groups according to specific criteria or rules or may update configurations or settings at communication portal 220. Alternatively or additionally, data may be stored at other computing devices associated with cloud/Internet 240. This stored data may be data of virtually any sort, including, yet not limited to digital certified images, maps, video, audio, sensor data, textual data, time/date, or location (GPS/latitude/longitude/other location data) data. Such updated configurations may include programming particular sensing devices with program code that that causes determinations to be shared with a group of electronic devices as soon as a determination has been made. For example, messages may be transmitted to emergency personnel or the general public immediately after a police officer identifies that a particular roadway is not safe to travel by associating updated user information. Computing device 250 may also be a controller that controls actions performed by other IOT devices or be a user device that can receive IOT device data. Such a user device may receive reports/analysis results that have been generated from sensed data. (example: autonomous auto navigation system receives an emergency update alert that a road barrier has just been erected to cover a failed road bed or failed bridge by a third party who is not part of the system)

Communicating portal 220 may include software used to register itself or associated sensors of sensor group 210 (S1-S4) during a configuration process. Functions performed by communication portal 220 may allow communication portal 220 to securely login to computing device 250 or to securely connect with user devices (not illustrated in FIG. 2). Communication portal 220 may capture, collect, synchronize data from sensors S1-S4, and transmit that data to computing device 250 via cloud/Internet 240 using communication channels 230A and 230B. In certain instances, communication portal 220 may also access received data when identifying that either raw sensor data or processed data is transmitted to computing devices 250. Data sent from communication portal 220 to computing device 250 may be sent according to one or more rules, settings, or policies. Such data may be sent continuously, after a particular event has been identified, or may be sent periodically according to a convention (e.g., schedule). Communication channels 230A and 230B may be implemented using either wired or wireless communication connections.

Sensors S1-S4 may communicate with communication portal using communication signals 210S1, 210S2, 210S3, and 210S4 that may also be implemented using either wired or wireless communication connections according to any known communication protocol, including those consistent with IOT device communications. As such communication portal 220 may be referred to as an IOT portal device. In certain instances, communication portal 220 and sensors S1-S4 may be part of a discrete device. For example, sensors S1-S4 may be associated with collecting data associated with a vehicle, and communication portal may be a computing device at that vehicle that receives sensor data. In such an instance, sensors S1-S4 may collect engine temperature data, vibration, trends, pressures, lubrication temperatures, inlet temperatures, outlet temperatures, liquid flows and levels, tire pressure/temperature, vehicle speed, engine revolutions per minute (RPM) historical, or other data.

Communication portal 220 may also include communication interfaces that receive sensor data or data from computing device 250. These interfaces may utilize any available wireless communication technology (such as 802.11/Wi-Fi, Bluetooth, near field data communications, or radio technology) or wired connections (such as USB or Ethernet) that receive data from other devices/sensors. Functions performed by communication portal 220 may be implemented partially or entirely by a processor executing instructions out of a memory, in firmware, as a state machine, in a software application program, in an application specific integrated circuit (ASIC), or in a field programmable gate array (FPGA).

The system architecture detail (FIG. 2) thus provides an overview of a system consistent with the present disclosure. Such a system may be configured to share data with particular devices according to a set of rules or conventions. Data capture may begin by any of sensors S1-S4, followed by secure transmission and storage of data into the cloud ecosystem 240. This may provide instant (real-time or near real-time) access to the captured data by any registered account holder via computing device 250. This type of capture device access may be provided via a mobile downloaded application. Alternatively or additionally, such program applications may be configured, controlled, and provided to other devices from controlling devices located at the cloud/Internet 240 or that may reside at other locations. Registered users may also access the data in real-time via the World Wide Web by logging in with their registered username and system access password (e.g., via a personal mobile user device).

Sensors S1-S4 and communication portal 220 may be associated with a group of devices where communication portal 220 or other devices may be required to install an application program ('app') before they can communication with computing device 250, user devices, or with computers in the cloud/internet. Such applications may be downloaded from a designated location such as a web application site (e.g., Apple App Store, Google Play application store). The application program may require registration, login, and password to access the system. The application may be used and integrated in a computing device. The registration may take place at a web page and may require a secondary email confirmation for security. Such a registration process may be used to identify devices that are associated with a group of devices. For example, sensors S1-S4 and communication portal 220 may be registered as a group of devices. In one example, a user may be required to select (e.g., click) an icon or enter information when a user email address is verified. In such an instance, a user device associated with that newly-registered user may then then be allowed to initiate operation of a program application such that features and functions consistent with the present disclosure may be performed.

Systems, apparatuses, and methods consistent with the present disclosure may allow heterogeneous or homogeneous electronic devices (e.g., from different manufacturers, using different operating systems and communication protocols) to communicate and perform new methods in new ways. This functionality may provide more efficient and cost-effective solutions and may decentralize functions that had previously and conventionally managed at a centralized location. Furthermore, this disclosure is directed to additional alternate versions of data collection systems that may include IOT systems. For example, computing device 250 may be a server, and communication portal 220 may be configured via a router that sends data sensed by sensors S1-S4 to computing device 250. As such, computing device 250 and communication portal 220 may be electronic devices from different manufacturers that are configured to communicate with each other using standard or proprietary communication protocols.

In certain instances, data received from sensing devices (e.g., sensors S1-S4 that are operated by a single entity or that may be operated by various diverse entities) may be communicated via a mesh network. The data from these different entities may be stored. Sensors consistent with the present disclosure may be embedded in worker tools, worksite motors, medical systems, shipping containers, ships, police vehicles, dash-cams, trains, autonomous cars/trucks, motorized vehicles, aircraft, or in-a drones, for example. Such sensors may also be associated with collecting information associated with a traffic signal, a building, a factory, factory operations, a home alarm or monitor control system, a law enforcement center, a boiler, or detecting alarm conditions that may be associated with a safety hazard. For example, a safety hazard may include a combination of unsafe breathing conditions (e.g. carbon monoxide at unsafe levels), a fire at a location, excessive water levels at a location (indicative of a flood or water surge), or an earthquake—where different aspects of each may be detected by different sensors. Some hazards may be related, however, and a coordinated response among a variety of different sensors and devices may be needed. Applications associated with the present disclosure may include yet are not limited to monitoring the effectiveness or efficiency of a home robot, a factory robot, an appliance, a refrigeration system, an engine, motor, an actuator/servo, a door opener, a system or set of solar panels, the operation of a set of computer systems (e.g. telecommunication, internet device, or router).

Apparatus and methods consistent with the present disclosure may allow communication portal 220 or computing device 250 to control sensors or sensing devices remotely, where data and commands may be communicated from or through communication portal 220. This may allow computing devices or sensing devices to be controlled according to rules, settings, or conventions. Such rules, settings, or conventions may allow distributed devices to perform functions or initiate actions in new and/or coordinated ways. Such functions or actions may include data analysis or may be related to a chain of events. Methods and apparatus consistent with the present disclosure may also forecast probabilities associated with forecasting/predicting future events based on analysis and data collected via one or more sensors, for example.

Communication portal 220 may be an IOT portal that may communicate with sensors S1-S4 that communicate sensed data via protocols associated with IOT devices, for example. Such an IOT portal may receive operational program code from computing device 250. IOT portals consistent with the present disclosure may also configure individual IOT sensors to send information to the IOT portal based a set of rules or configuration information. For example, sensors S1-S4 may be intelligent sensors that are configured to send data to communication portal 220 when a measured wind velocity reaches a threshold level. In certain instances, communication portal 220 may be a user device, such as a cell phone, personal computer, tablet computer, or other device operated by a user. Communication portal 220 may communicate with IOT devices according to an IOT protocol over a first communication channel and may communicate with computing device 250 via a second communication channel using any protocol known in the art.

Figure 3:
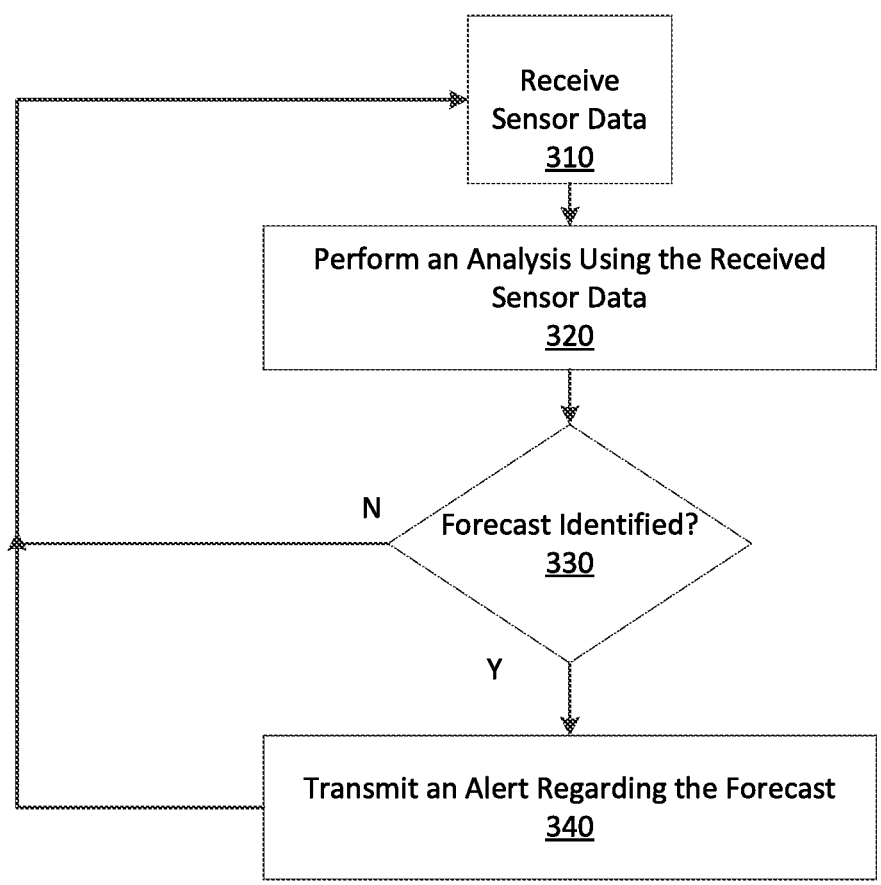
FIG. 3 is a flowchart that illustrates an exemplary method of analyzing received sensor data and triggering alerts sent to electronic devices.

FIG. 3 is a flowchart that illustrates an exemplary method of analyzing received sensor data and triggering alerts sent to electronic devices. Alerts sent to these electronic devices may be sent after a forecast has been made using received sensor data. Step 310 of FIG. 3 is where sensor data may be received by an electronic device. The electronic device that receives the sensor data may be any of computing devices 150/250, communication portal 220, or IOT device 110 of FIGS. 1-2. In step 320 of FIG. 3, an analysis is performed on the received sensor data, and then determination step 330 may identify whether the analysis identifies a forecast that may result in an alert being transmitted or otherwise synchronized to one or more other electronic devices. When determination step 330 does not identify a forecast, the method may return to step 310 of FIG. 3. Alternatively, when determination step 330 identifies a forecast, the method may proceed to step 340 where the alert is sent to other electronic devices. After step 340, the method may proceed to step 310 of FIG. 3, where additional sensor data may be received.

A set of electronic devices in a region may collect sensor data that is transmitted to a computing device that performs the analysis of step 320 (FIG. 3). The set of electronic devices may be or may include sensors that sense data associated with pre-cursor events may be used to identify specified users or the public at large that a substantial event may be about to occur. For example, a set of sensing devices distributed through canyon lands may collect and concatenate data that indicates that a flash flood is possible or is likely to occur at a specific set of hiking trails. When the analysis of step 320 identifies that a flash flood is likely to occur at a particular location in step 340, the alert of step 340 may be transmitted to user devices that are currently located in a region where the flash flood is likely. Such transmissions may be sent using a cellular telephone network, via a radio communication signal, using ultra-high-frequency (UHF), or very-high-frequency (VHF) transmission media. Alternatively or additionally, these transmissions may sound an audio alarm (e.g., warning sirens). In such instances, audio warning devices may be powered by renewable power sources (e.g., solar or wind). As such, this disclosure is also directed to higher-level data collection and analysis for providing more useful information that can be utilized for decision making, event detection, or analysis. Connected devices may also be used to identify that a rain storm in one area may precede a substantial flash flood in another area.

Analytics consistent with the present disclosure may identify conditions or sets of conditions that can lead to an event or to a related set of events. In another example, a higher than normal operating temperature of an engine could be associated with one or more possible root causes. Such analytics may identify a relation to any one of a low coolant liquid level, a flow rate of liquid coolant, or temperature change of a coolant liquid through a thermal exchanger (e.g., a radiator). In such instances, a first sensor could sense a level of the liquid coolant; a second sensor could sense the flow rate of the coolant liquid; a third sensor could sense a temperature of the coolant liquid before that liquid enters a radiator; and a fourth sensor could sense a temperature of the coolant liquid exiting the radiator. An analysis of this sensor data may be used to identify a likely root cause of a higher than normal temperature at the engine and could be used to identify a specific failure mechanism. In such instances, a low coolant liquid level could be associated with a liquid leak; a low flow rate of coolant liquid could be associated with a failing engine water pump; or a temperature change of a liquid flowing through the radiator could indicate that a fan blowing air over the radiator is not operating properly. Furthermore, other sensors could be used to monitor the speed of a coolant fan or to identify that the coolant fan is likely not the cause of a loss of efficiency in the radiator of a cooling system. Such sensor data could also be used to generate an alert sent to a user device of a driver of the vehicle. This alert may notify the driver to add additional coolant to a liquid reservoir soon, before a water pump at the vehicle fails. Alternatively or additionally, a sensor sensing vibrations may trigger a notification that bearings associated with a water pump or with a cooling fan be checked due to indications of possible failure. As such, sensor data relating to different functions of an engine liquid coolant system can be used to identify potential failures or to forecast/predict likely future failures.

Furthermore, other sensors could sense a number of revolutions per minute (RPM) of an engine and a velocity of a vehicle. In another example, a set of data that includes temperature data may be compared to workload that an engine is currently performing in order to identify that an elevated engine temperature is likely related to a high workload of the engine and not to other factors. Based on this workload and temperature data, an alert may be sent to user devices recommending that the size of a coolant liquid repository of an oil repository be increased to reduce stress on parts in the engine. As such, historical data may be combined with current data to identify how to improve or modify the operation or design of a system or apparatus, as well as provide an indication of lifespan (e.g., before total failure is predicted to occur). Similarly, other metrics may be evaluated by an analytical engine consistent with the present disclosure that monitor rotational speeds, operating pressure, gearbox function, fuel flows, or orientations associated with an apparatus. Examples of orientation sensors include sensors capable of sensing pitch, roll, or yaw movements of a vehicle, a boat, an aircraft, or drone. Such sensors could be used to identify yaw velocity, lateral acceleration, tangential speeds, or linear acceleration, for example.

Figure 4:
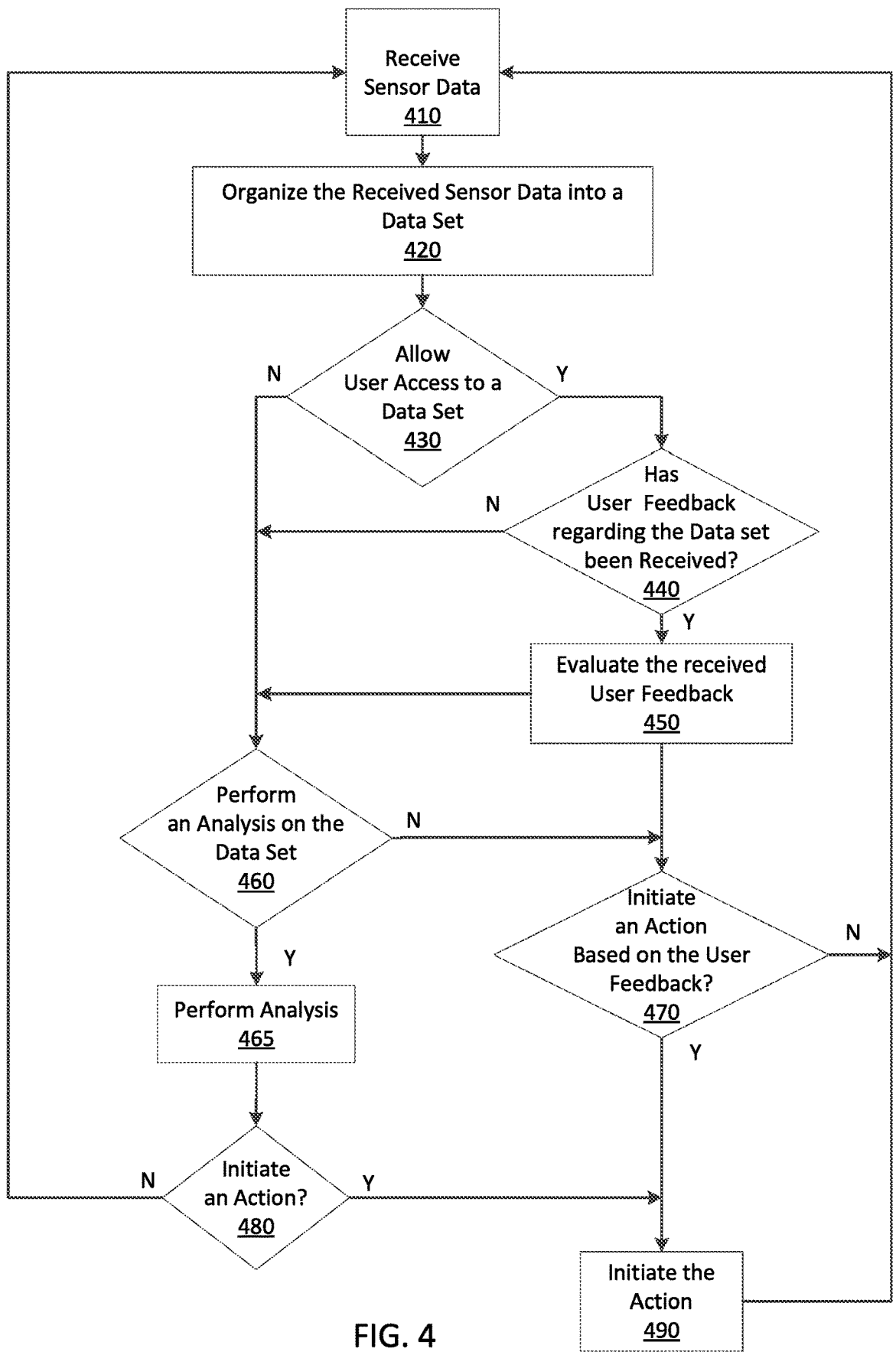
FIG. 4 is a flowchart illustrating an exemplary method for distributing sensor data to authorized user devices for analysis.

FIG. 4 is a flowchart illustrating an exemplary method for distributing sensor data to authorized user devices for analysis. FIG. 4 includes step 410 where sensor data is received at a computing device. The sensor data received in step 410 may include sensor data from one or more sensors or devices transmitted over a computer network, such as the cloud/Internet of FIGS. 1-2. In certain instances, the data received may be associated with a particular device that is combined with data collected by other devices. In one example, a shock detection system at a vehicle may receive image data broadcast by other devices in step 410 of FIG. 4, where that data may be stored in a data repository for at least a threshold period of time. In an instance where a vehicle shock detection system at the vehicle detects a shock event that is above a threshold level, the shock detection system may send the received image data and an alert indication to a computer in the cloud. In such an instance, the image data may have been collected by a camera associated with a parting lot. This collected data may be evaluated to identify whether the shock event is associated with a chain of events, such as wind blowing debris into the vehicle or that the shock event was associated with an accident or a malicious act. Authorized user devices may be identified via an authentication process associated with a user account or with a user group. In certain instances, functionality consistent with the present disclosure may require authentication and authorization, both for the account and the actual use of transmitting digital data.

After receiving the data, a computer may organize and store that received data as a data set in step 420 of FIG. 4. Determination step 430 may then identify whether a user can be allowed to receive or access the data set. When yes, the method may proceed to step 440. Alternatively, when user access has not been identified as authorized or allowed in step 430, the method may proceed to step 460 of FIG. 4. Step 440 is a determination step that identifies whether user feedback has been received regarding the data set. When determination step 440 identifies that user feedback has been received, that user feedback may be evaluated in step 450 of FIG. 4. The feedback provided in step 450 may then be used in either step 460 or step 470 of FIG. 4. Determination step 470 may identify whether an action is triggered based on the received user feedback or not. When step 470 identifies that an action should not be initiated based on the received user feedback, the method may return to step 410 where more data may be received. When step 470 of FIG. 4 identifies that an action should be initiated based on the user feedback, an action may be initiated in step 490. For example, when the user feedback indicates that the shock event was associated with an accident or with a malicious act, data relating to that shock event may be persistently stored as a record that could be provided to the police or to an insurance company for further action. When step 440 identifies that user feedback has not been received, the method may proceed from step 440 to determination step 460.

When the method proceeds to determination step 460 of FIG. 4 step 460 may identify whether an analysis should be performed on the data set. In an instance when no analysis should be performed on the data set, the method may proceed to the previously discussed determination step 470. When determination step 460 identifies that an analysis should be performed on the data set, that analysis may be performed in step 465, after which determination step 480 may identify whether an action should be initiated based on the analysis. When determination step 480 identifies that an action should not be initiated, the method may return to step 410. Alternatively, when determination step 480 identifies that an action should be performed based on the analysis, an action may be initiated in step 490 of FIG. 4. Note that step 490 may initiate actions based on received user feedback, the analysis, or a combination of both. Actions that may be performed based on the analysis of step 465 may include storing a report. In such instances, the report may identify other shock events that have occurred at the location associated with the sensors over a period of time. A report that indicates that a particular area is associated with a significant number of malicious acts, may cause an alert to be generated that recommends that that particular area should be avoided, informs a property management, or that recommends that the area be patrolled by police or a security team more frequently. In addition, reports may also be synchronized with various different electronic devices and those reports may be preserved in a record retention system. Data collected via electronic devices consistent with the present disclosure system may also be accessible via one or more social networks, such as Facebook, Twitter, or other data sharing network. In certain instances, a constant stream of static or current updated data can be shared with particular social media networks. In yet other instances, a smart transportation system may be programmed to adapt to current traffic conditions by changing the timing of traffic signals. In such instances, sensing devices may report information to a database or share information amongst themselves when managing traffic flow. After step 490, the method may return to step 410 of FIG. 4, where additional sensor data may be received.

As mentioned above in respect to FIG. 4, a particular device may receive data sensed or collected by sensors or devices that are separate from a particular device. Alternatively or additionally, data from sensors or devices separate from a reference device may be transmitted from these separate sensors/devices to a cloud computer and data sensed by sensors at the reference device may be transmitted to the cloud computer. In such an instance, the cloud computer may perform an analysis that identifies data from a region (geographical location or geolocation) close to or that surrounds that location (geographical/geolocation perimeter). An analysis performed by the cloud computer may identify environmental factors that may affect the performance of apparatus associated with a reference device. For example, data collected from buoys in a waterway may be combined with data from sensors on a boat when performing an analysis that identifies a preferred route that the boat could proceed along to reach a destination using a minimal amount of fuel. The buoy data may be combined with data from a global positioning (GPS) system on the boat, with boat rudder positioning data, and with boat motor data could be used to identify that the course of the boat should be modified to save fuel to reach that particular destination.

In addition, reports may also be synchronized with various different electronic devices and those reports may be preserved in a record retention system. Data collected via electronic devices consistent with the present disclosure system may also be accessible via one or more social networks, such as Facebook, Twitter, or other data sharing network. In certain instances, a constant stream of static or current updated data can be shared with particular social media networks. In yet other instances, a smart transportation system may be programmed to adapt to current traffic conditions by changing the timing of traffic signals. In such instances, sensing devices may report information to a database or share information amongst themselves when managing traffic flow.

Method and apparatus consistent with the present disclosure may include a web interface component that may be initiated with a secure login after an initial registration process. The system may then display a series of portal pages, where a home page may list all the events by time or date in an organized fashion sequentially as they are received from remote sensing devices. Captured digital data, image data, reports, video, and audio may be identified under a media tab. Each digital image may contain mobile positioning data, GPS location data, and system data. This data may be integrated into an image along with the time, date, seconds, or time zone, camera heading, for example. Each digital data or image may be watermarked to ensure data integrity. Each image may also be accompanied by the media information file, which may identify a camera or sensing device that captured that particular image data, along with an actual user name, device identifying number, device orientation, or elevation, for example. Other data can be collected as well, such as detailed weather data, rate of movement, or speed and orientation. A user interface may be configured to allow a user to access multilevel pages available from a master portal webpage. Reports, media, storyboard, maps, or captured data may be overlaid on street maps or satellite maps. Terrain, boundary, or political maps can be generated into user specific formats. Such maps may be generated according to user settings set over a user interface at a user device. Furthermore, event data can be overlaid, oriented, or notated on maps by time selection. A storyboard function may allow data images, maps, text, and legacy data to be integrated into one electronic page, so a user can build a story or chain the events. When such a storyboard is complete, all facts and data associated with the storyboard may be stored and presented on one or more electronic storyboard pages that may be shared with other electronic devices.

Figure 5:
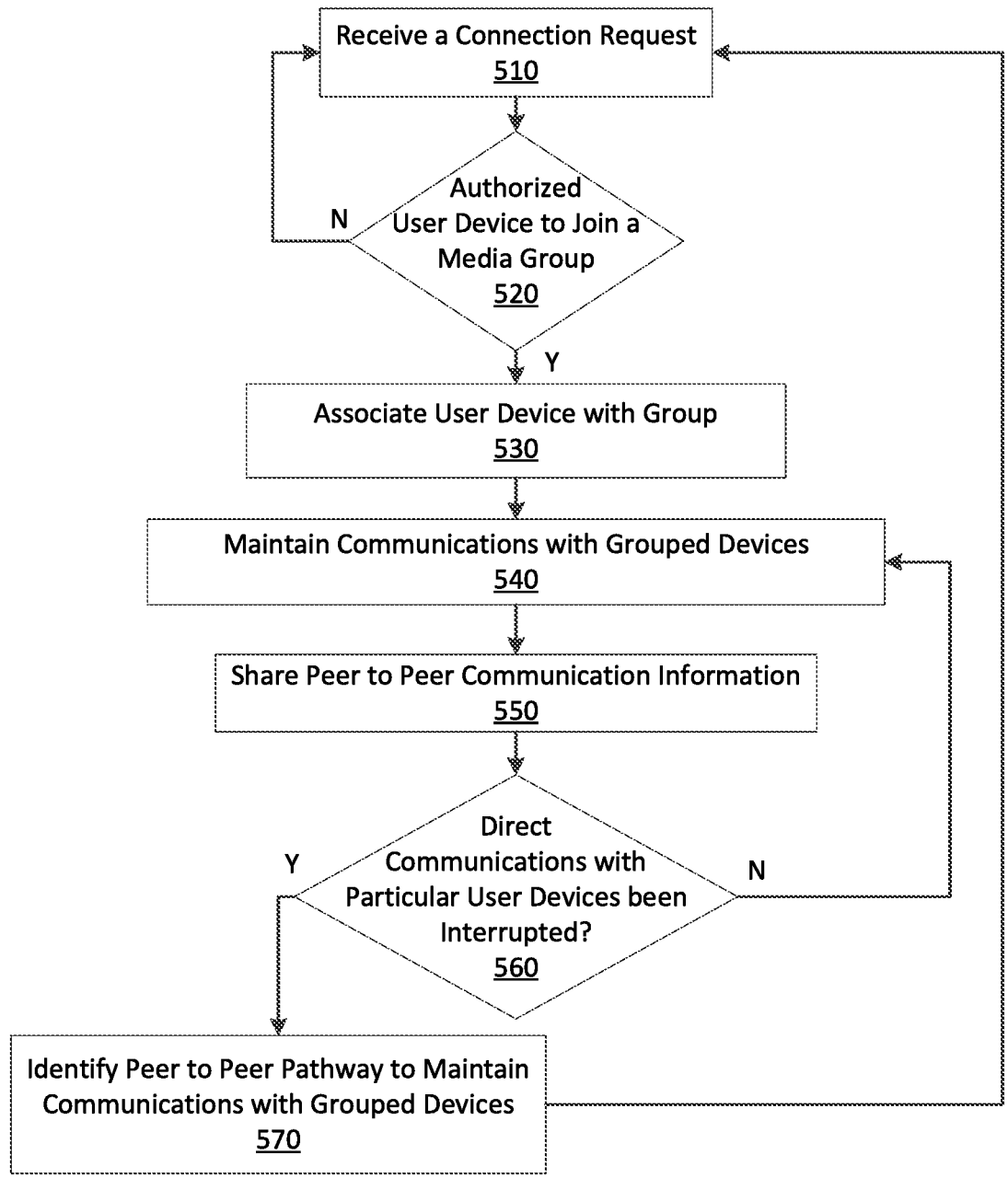
FIG. 5 is a flowchart that illustrates an exemplary method of grouping user devices into a user group.

FIG. 5 is a flowchart that illustrates an exemplary method of grouping user devices into a user group. A group of devices may be linked through one or more different types of communication channels in order to maintain communications between that group of devices even when particular communication channels fail. Step 510 of FIG. 5 is a step where a connection request may be received from a user device. Such a connection request may include information that validates that a user of the user device is authorized to participate in a particular media or data sharing group. Such a group may be a group of individuals that are authorized to administrate emergency services, for example. Alternatively, a media or data sharing group may include members of the pubic associated with a particular event or location.

Step 520 may be used to validate that the connection request is associated with a user device that is authorized to participate in a particular media/data sharing group. Additionally or alternatively, step 520 of FIG. 5 may be used to associate a user of the user device with a particular media or data sharing group. Information used to authenticate a user may include a password, biometric data, or other information commonly used to authenticate the identity of a user. Information used to identify a media or data sharing group to assign to a particular user device may include keywords that identify or that are associated with an event. For example, keywords of "storm," "hurricane," "wild fire," or "active shooter" may be used to identify a particular group. Such keywords may also be combined with geographic information to identify that a particular user is referring to hurricane Mary or to a fire in a region. Additionally, keywords may be very specific and may identify an objective. Keywords of "evacuation path to escape storm" may be combined with location information to identify that the user wishes to be provided with information regarding a best path to use to escape storm conditions from their current location. Other additional keywords or parameters that may be associated with methods and systems of the present disclosure may relate to traffic in an area, a current state of public transportation, the performance of a vehicle, the efficiency of a manufacturing process, or water quality in an area.

When step 520 identifies that the user device is not authorized to participate in a particular group, the method may return to step 510, where other connection requests may be received. When step 520 identifies that the user device is authorized to participate in a group, the method may proceed to step 530 of FIG. 5, where the user device may be associated with a group of user devices. Next, in step 540, communications between the different user devices in that group may be maintained. Communications shared between user devices in step 540 may be shared between a central communications center directly with the group of user devices. As such, the communication center may share data relating to a given emergency in near real time with each respective grouped device. Here again, this data may include sensor data from remote sensors, from sensors associated with specific user devices, or may include information regarding an evacuation plan. In certain instances, a particular user device may be identified as a leader user device and commands may be sent to other user devices in the group of user devices based on the command being sent from the identified leader user device.

Step 550 of FIG. 5 is a step where peer-to-peer communication information may be shared with respective user devices within the grouped user devices. Such peer-to-peer communication information may allow different user devices to communicate with each other directly. In certain instances, these peer-to-peer communications may be transmitted via a different communication medium than communications with a central communication center. For example, communications with a central communication center may be performed via a cellular telephone network and peer-to-peer communications may be performed using ultra-highfrequency (UHF) radio signal, very-high-frequency (VHF) radio signal, microwave transmission, or satellite phone system, and satellite communication.

Determination step 560 of FIG. 5 may identify whether direct communications with particular user devices has been interrupted. When no, the method may return to step 540 of FIG. 5, where communications between the grouped devices are maintained. When step 560 identifies that communications with a particular grouped device has been interrupted, communications may be sent through one or more peer devices that can communicate with that particular grouped device in step 570. As such, methods consistent with the present disclosure may allow grouped devices to communicate with other devices using any available communication pathway. In an instance where a first cell tower has been compromised or damaged, communications may be passed between grouped devices via peer-to-peer communications. Such communications may then be passed to the central communication center via a second cell tower that at least one of the peer devices can communicate with. In certain instances, particular grouped devices may be part of an infrastructure of a city or state. Furthermore, certain grouped devices may include other forms of communication channels that include, yet are not limited to wired communications, optically linked interconnections, different radio communication bands, or satellite communications. After step 570, the method of FIG. 5 may return to step 510, where additional connection requests may be received.

Apparatus and methods consistent with the present disclosure may receive signals that identify a location. For example, global positioning system (GPS) data may be received from mobile assets to identify a location. Such location systems may also include forms of assisted GPS that may use transmissions from cell towers or beacons when identifying a location. Alternatively, location systems may include one or more beacons from which a location can be interpolated. Location systems consistent with the present disclosure may be included in or associated with an aircraft, a drone, a piece of construction or farm equipment, an autonomous vehicle, or a robot, for example.

Figure 6:
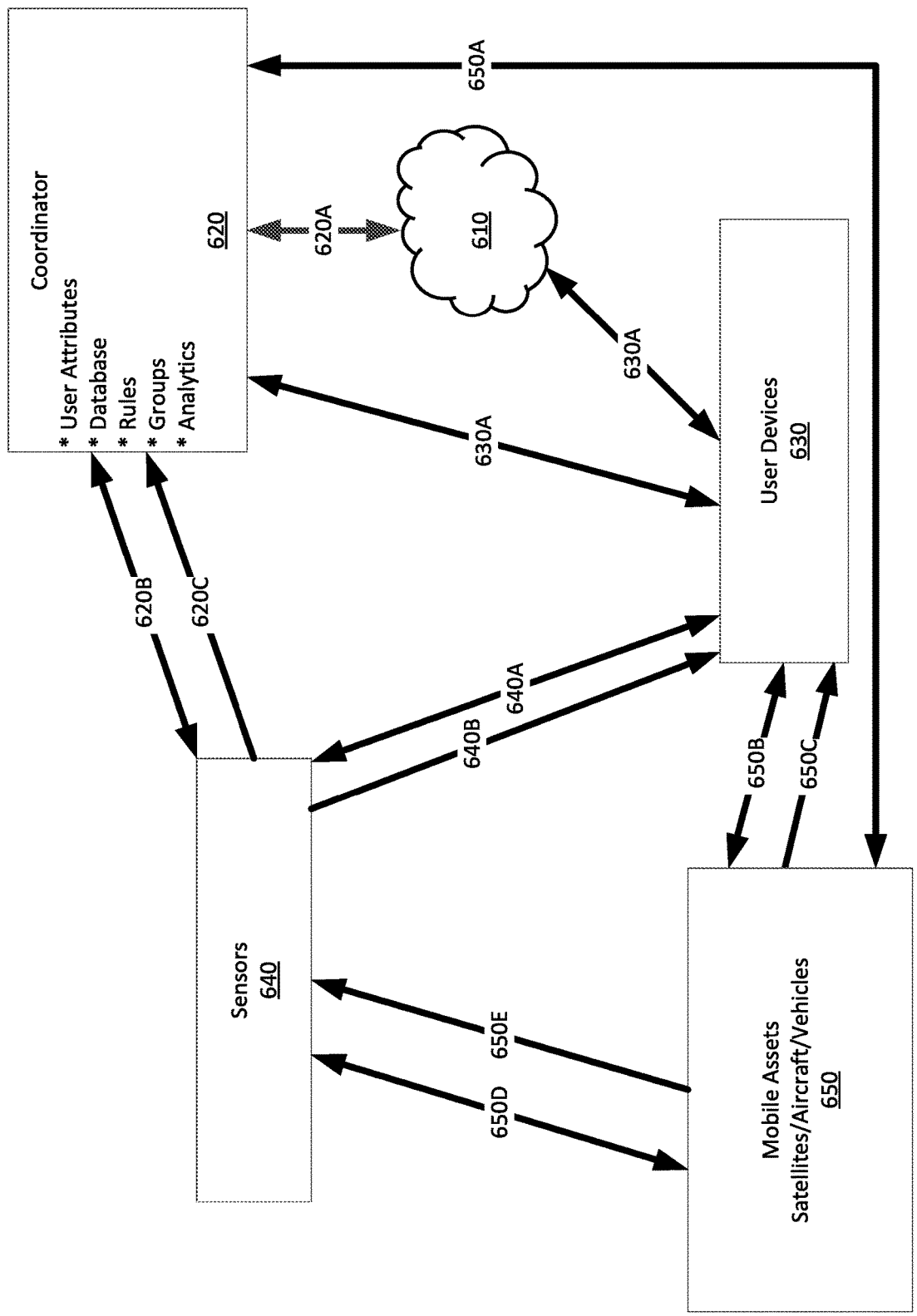
FIG. 6 illustrates various different devices that may be associated with an apparatus or method consistent with the present disclosure.

FIG. 6 illustrates various different devices that may be associated with an apparatus or method consistent with the present disclosure. FIG. 6 includes cloud or Internet 610, controller 620, user devices 630, sensors 640, and mobile assets 650 that may include one or more satellites, aircraft, or vehicles (cars, boats, or trucks). Note that user devices 630 may communicate with coordinator 620 via the cloud or internet 610 using communication pathways 630A and 630A. FIG. 6 also illustrates that user devices may communicate with coordinator 630 using communication pathway 630A that may not require cloud or Internet 610.

Sensors 640 may send sensor data to user devices 630 via bi-directional communication pathway 640A or via unidirectional pathway 640B. Sensors 640 may communicate with coordinator 620 via bi-direction communication pathway 620B or unidirectional pathway 620C. Sensors 640 may also receive data from mobile assets 650 via bi-directional pathway 650D or unidirectional pathway 650E. Mobile assets 650 may also communicate with user devices 630 via bi-directional pathway 650B or unidirectional pathway 650C. Mobile assets may also communicate with coordinator via communication pathway 650A. Alternatively or additionally, sensors 640, mobile assets 650, and coordinator 620 may communicate with each other via cloud or Internet 610 communication pathways not illustrated in FIG. 6.

The various elements included in FIG. 6 may communicate with each other via one or more different redundant communication pathways. Data collected from one or more devices may be sent by coordinator 620 via different communication pathways, and coordinator 620 may organize that data into data sets that may be reviewed or accessed by users of user devices 630. Additionally or alternatively, coordinator 620 may review these sets of data when performing tasks. Coordinator 620 may organize this data using attributes that could be used to identify particular sensors, particular locations, particular times, or particular affiliations of specific users. Coordinator 620 may use login or other attribute information to organize data into sets that can be stored into in a database. Such sets of data may be stored or accessed according to a set of rules. For example, members of a security group may be allowed to access data relating to a security event based on a set of rules that only allow security group members to access security event data. Coordinator 620 may be configured to perform analytics on collected data or work with other devices that perform analytics on received sets of data.

Sensors 640 or a communication portal that collects sensor data may communicate with mobile assets 650 via communication pathway 650D or 650E when other communication pathways are unreliable or non-functional. Mobile assets 650 may be part of a mesh network that includes vehicles within range of a radio transceiver associated with sensors 640 or a communication portal. Furthermore, as a particular mobile asset moves out of range, communications may switch to another mobile asset such that communications are maintained.

The documenting of facts may relate to collecting data or factual information. As such, data collected by coordinator 620 may be associated with a date, a location, a media, a media type, audio data, video data, computer meta-data, or computer forensic data. In such instances, collected data may be used to create a certified set or chain of certified digital evidence. For example, images acquired by one or more insurance adjusters may be used to identify how a fire spread through a community and be used to identify a location where the fire started. Each image acquired by an insurance adjuster may be associated with a date/time and be signed with a digital signature (or watermark) when an insurance claim is generated. Such insurance claims could include an image of a property title, a receipt indicating the value of a destroyed asset, or a damage estimate that may then be included in a report. Similarly, such images could be used to identify assets that were damaged, when an insurance company assesses their liability after a natural or manmade event (e.g. flood, earthquake, fire, theft, or act of vandalism). As such, methods and systems consistent with the present disclosure may allow insurance systems to process claims or pursue other remedies in more scalable and efficient ways. Furthermore, insurance adjusters may also be able to access data collected by sensors at a time before and after a disaster occurred. Insurance reports could then include data collected before, during, and after the occurrence of a particular event.

Estimations relating to the cost of specific jobs may be created by a processor executing instructions out of a memory, where information from a database is parsed or evaluated when estimating the cost of a construction job, when identifying costs associated with damage recovery of a home or business, or with settling an insurance claim. Such costs may be related to the replacement of building materials (wallboard, carpet, padding, lumber, electrical hardware, paint), labor, transportation, or other fees/costs (taxes, overhead costs). In certain instances, a database that stores relevant data may be accessible via the internet, where a sensing device associated with the collection and evaluation of that data may also update information stored in the database based on processing capabilities resident to particular electronic devices.

Information associated with a particular insurance claims may include any information that may be relevant to an accident or event on land, at sea, or in the air. Such information may include time/date/time zone/latitude/longitude, elevation, altitude, compass heading, orientation, or compass heading, for example. Methods and systems consistent with the present disclosure when integrated into one or more reports may form an accurate record of conditions at a location in near-real time as information is associated with a particular event.

In another example, video data from cameras that captured information at a time when protest occurred could be used to identify individuals that damaged property during the protest. Since data collected from a set of different electronic devices may be processed in a manner that associates or cross-references collected data, such networked digital data allows the capability of converging data in ways that increase the visibility of a data set or chain of events. As such, a system of users that may be physically located anywhere may still be able to monitor activities in a manner that allows the orchestration of actions in ways that were not previously possible.

Figure 7:
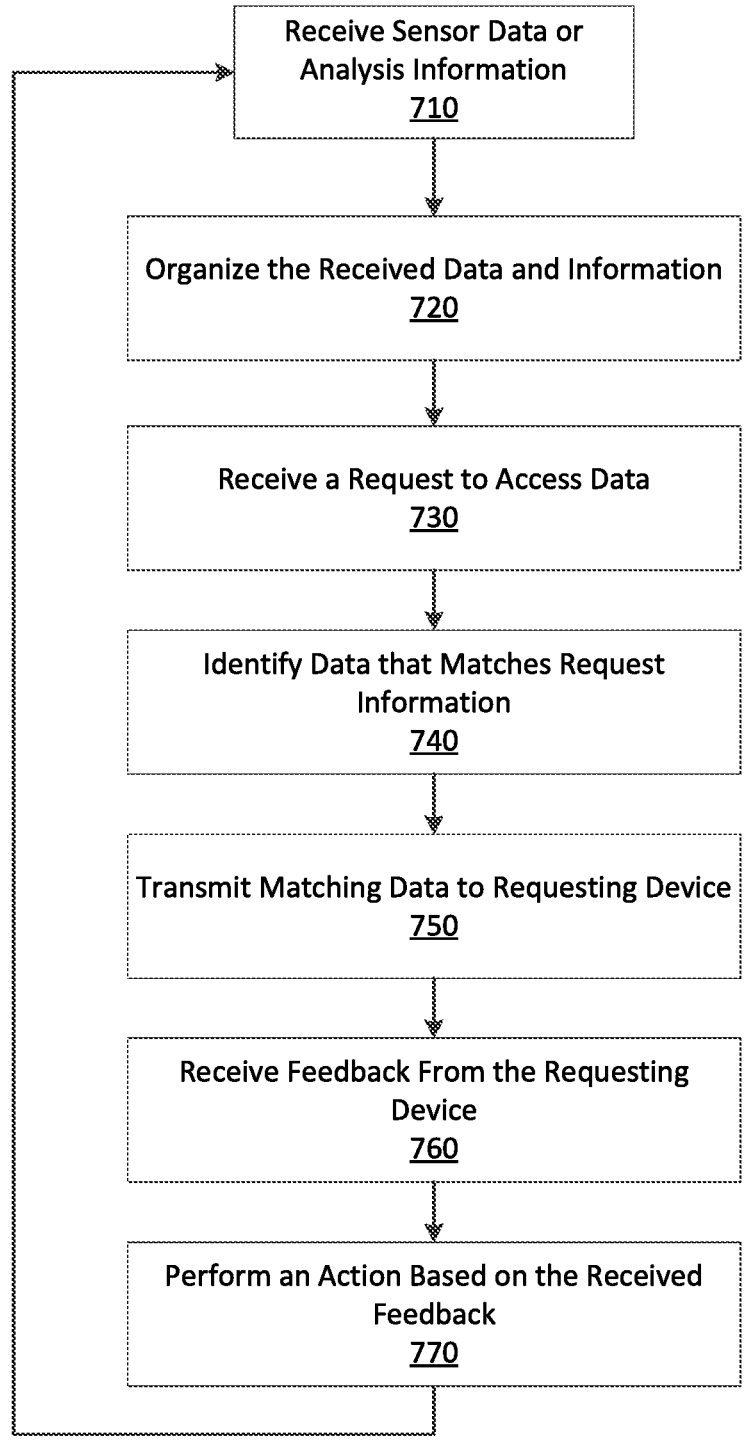
FIG. 7 is a flowchart that illustrates an exemplary method for organizing received data for usage by different user devices.

FIG. 7 is a flowchart that illustrates an exemplary method for organizing received data for usage by different user devices. In step 710 of FIG. 7 sensor data, analysis information, or both sensor data and analysis information are received. Step 720 of FIG. 7 is a step where the received sensor data or analysis information are organized into one or more data sets. The data sets may be organized and provided to users according to settings/selections or rules that identify a location, a particular date or time, membership in a user group, or one or more keywords. For example, data received from sensors distributed around a city are stored according to date, time, and address. Data from cameras located throughout the city may be stored in data sets associated with particular zones of the city. Furthermore, video from cameras located in vehicles associated with members of neighborhood watch group may be stored in data sets associated with the neighborhood watch group. After various sets of data have been stored in respective data sets, a request to access data may be received from a user device in step 730 of FIG. 7. The request received in step 730 may include information that identifies a date, a time frame, and a location within the city where a crime occurred. The received identification information may be used to identify videos from cameras located in the vicinity of the crime and to identify relevant video from the cameras of the members of the neighborhood watch group in step 740 of FIG. 7. In such instances, relevant camera video may be identified using metadata stored with the acquired neighborhood watch group video. This metadata could include time, date, and location data that most closely matches the date, time frame, and location information associated with the request. After relevant data has been identified in step 740 of FIG. 7, that data may be transmitted to the user device in step 750 of FIG. 7.

After the relevant matching data has been received at a user device a user of the user device may view all of the respective matching video data and that user may select portions of video data that they wish to include in a report. Once the user of the user device makes a series of selections, the user may also provide verbal or written information that describes why certain particular selections should be relevant to investigating the crime or that should be included with an insurance claim associated with the crime. For example, the user could identify video of a suspect peeking into different windows of different stores as that suspect walked down the street and the user could identify images that show the suspect performing the crime. Once the user makes these selections and audio or written comments, that information may be sent back as feedback information in step 760 of FIG. 7 and an action may be performed with that feedback information in step 770 of FIG. 7.

Actions performed in step 770 of FIG. 7 may include one or more of storing the feedback information in a data set, sending the feedback information to the police in a police report, or sending the feedback information to an insurance company as part of an insurance claim. The crime information received in step 760 may also be cross referenced with other crime information when a chain of events associated with the suspect is identified. The chain of events associated with the suspect may be used to identify a pattern of criminal activity performed by the suspect. For example, a series of crimes may have occurred over a period of time, each that appear to be associated with the same suspect. Once identified, this analysis information may be received in step 710 of FIG. 7 after feedback step 770 and this analysis information may then be used by the police to predict the next suspect criminal activity and catch the suspect when he performs a next crime. As such, methods and systems consistent with the present disclosure may be used to identify how and why portions of data from different data sets are related to a previously unknown chain of events.

Methods and systems consistent with the present disclosure may also use or organize information according to other metrics, for example elevation data may be combined with storm data and temperature data when predicting an elevation where rain will turn into snow. In another example, barometer information may be used to instruct an arthritis sufferer to take pain medication based on a forecast that associates a reduction in barometric pressure with the onset of arthritis pain. In yet another example, when a vehicle parked in a parking lot is hit by another vehicle, a sensor device at the parked vehicle may be able to access data acquired by cameras at that parking lot or a good Samaritan who could take a photo and leave notice on windshield of the subject for later request and upload. In such an instance, the sensor device at the vehicle may have received video data transmitted by the parking lot cameras in real-time, before, during, an after the accident. Alternatively or additionally, image data acquired by the parking lot cameras that was sent and stored at a data repository could be accessed to identify a vehicle or a driver of the vehicle that was responsible for the accident.

As such, methods and systems consistent with the present disclosure are associated with many different individual unique functions for identifying how different apparently unrelated sets of data include information that relate to a same root cause or to a particular chain of events. Once data from different data sets are organized, they may be associated or cross-referenced using a data structure. Such data structurers may include file data cross-referenced in a table or by links in a linked list. Such linked sets of data may form an album or media set that can be reviewed by identifying associations included in the table or by traversing the linked list.

Figure 8:
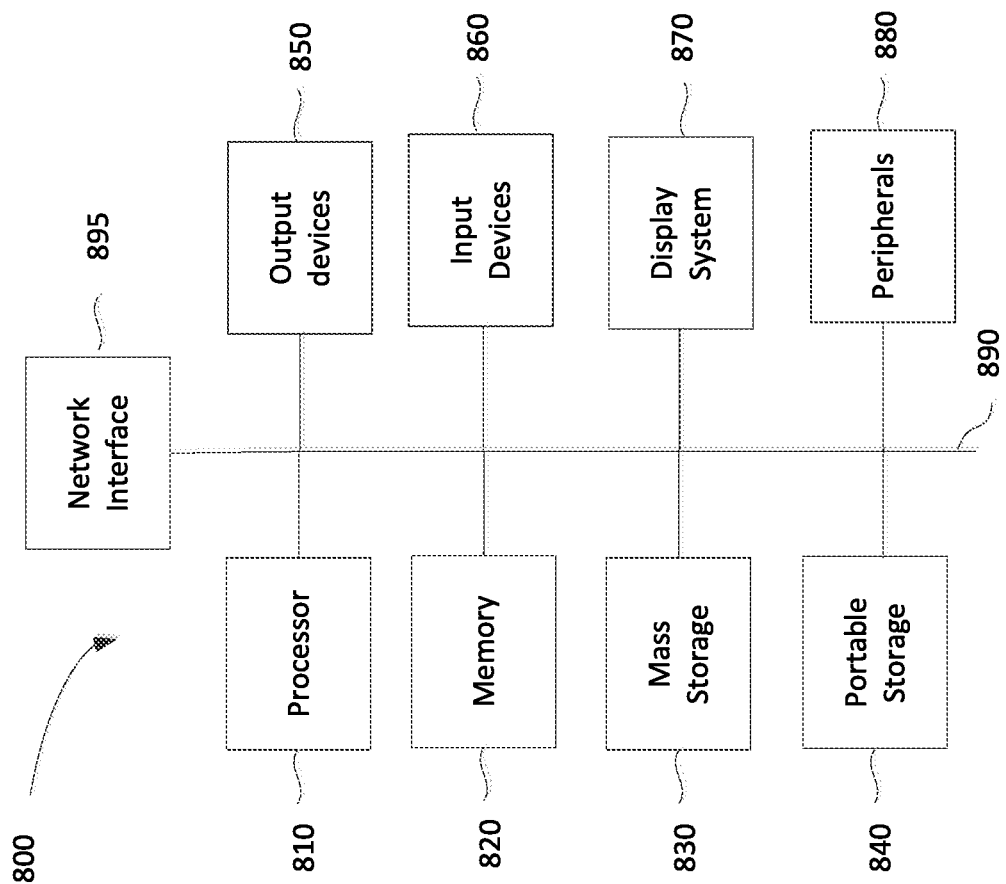
FIG. 8 illustrates a computing system that may be used to implement an embodiment of the present invention.

FIG. 8 illustrates a computing system that may be used to implement an embodiment of the present invention. The computing system 800 of FIG. 8 includes one or more processors 810 and main memory 820. Main memory 820 stores, in part, instructions and data for execution by processor 810. Main memory 820 can store the executable code when in operation. The system 800 of FIG. 8 further includes a mass storage device 830, portable storage medium drive(s) 840, output devices 850, user input devices 860, a graphics display 870, peripheral devices 880, and network interface 895.

The components shown in FIG. 8 are depicted as being connected via a single bus 890. However, the components may be connected through one or more data transport means. For example, processor unit 810 and main memory 820 may be connected via a local microprocessor bus, and the mass storage device 830, peripheral device(s) 880, portable storage device 840, and display system 870 may be connected via one or more input/output (I/O) buses.

Mass storage device 830, which may be implemented with a magnetic disk drive or an optical disk drive, is a non-volatile storage device for storing data and instructions for use by processor unit 810. Mass storage device 830 can store the system software for implementing embodiments of the present invention for purposes of loading that software into main memory 820.

Portable storage device 840 operates in conjunction with a portable non-volatile storage medium, such as a FLASH memory, compact disk or Digital video disc, to input and output data and code to and from the computer system 800 of FIG. 8. The system software for implementing embodiments of the present invention may be stored on such a portable medium and input to the computer system 800 via the portable storage device 840.

Input devices 860 provide a portion of a user interface. Input devices 860 may include an alpha-numeric keypad, such as a keyboard, for inputting alpha-numeric and other information, or a pointing device, such as a mouse, a trackball, stylus, or cursor direction keys. Additionally, the system 800 as shown in FIG. 8 includes output devices 850. Examples of suitable output devices include speakers, printers, network interfaces, and monitors.

Display system 870 may include a liquid crystal display (LCD), a plasma display, an organic light-emitting diode (OLED) display, an electronic ink display, a projector-based display, a holographic display, or another suitable display device. Display system 870 receives textual and graphical information and processes the information for output to the display device. The display system 870 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 880 may include any type of computer support device to add additional functionality to the computer system. For example, peripheral device(s) 880 may include a modem or a router.

Network interface 895 may include any form of computer interface of a computer, whether that be a wired network or a wireless interface. As such, network interface 895 may be an Ethernet network interface, a Bluetooth wireless interface, an 802.11 interface, or a cellular phone interface.

The components contained in the computer system 800 of FIG. 8 are those typically found in computer systems that may be suitable for use with embodiments of the present invention and are intended to represent a broad category of such computer components that are well known in the art. Thus, the computer system 800 of FIG. 8 can be a personal computer, a hand held computing device, a telephone ("smart" or otherwise), a mobile computing device, a workstation, a server (on a server rack or otherwise), a minicomputer, a mainframe computer, a tablet computing device, digital camera, a wearable device (such as a watch, a ring, a pair of glasses, or another type of jewelry/clothing/accessory), a video game console (portable or otherwise), an e-book reader, a media player device (portable or otherwise), a vehicle-based computer, some combination thereof, or any other computing device. The computer can also include different bus configurations, networked platforms, multi-processor platforms, etc. The computer system 800 may in some cases be a virtual computer system executed by another computer system. Various operating systems can be used including Unix, Linux, Windows, Macintosh OS, Palm OS, Android, iOS, and other suitable operating systems.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, FLASH memory, a flexible disk, a hard disk, magnetic tape, any other magnetic medium, a CD-ROM disk, digital video disk (DVD), any other optical medium, RAM, PROM, EPROM, a FLASH EPROM, and any other memory chip or cartridge.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.).

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A method for synchronizing digital data captured from electronic devices, the method comprising:
   sending operation program code to a group of electronic devices to share sensor and media data according to a data distribution rule;
   storing data sets received from each of the group of electronic devices according to the data distribution rule, each data set identifying which electronic device provided respective portions of the data sets, wherein one or more of the data sets includes the sensor and media data;
   receiving a communication indicative of an event from a sending one of the electronic devices;
   initiating an analysis based on the received communication, the analysis evaluating the sensor and media data included in the one or more data sets, wherein analysis results of the analysis identify that a portion of the sensor and media data is associated with the event indicated by the received communication; and triggering a function based on the analysis results, wherein the triggered function includes providing the analysis results to one or more other electronic devices that are part of the group of electronic devices.

2. The method of claim 1, further comprising:
identifying that at least one of the other electronic devices of the group of electronic devices cannot communicate via a first communication channel; and
identifying a second communication channel associated with the at least one electronic device, wherein the analysis results are provided to the at least one electronic device via the identified second communication channel.

3. The method of claim 1, further comprising:
identifying that at least one of the other electronic devices of the group cannot communicate via a first communication channel; and
sending a communication to the at least one electronic device, the communication indicating that information relating to that event is to be forwarded to the at least one electronic device via a second communication channel.

4. The method of claim 1, further comprising identifying that the group of electronic devices is configured to communicate with a sensor in accordance with a specified Internet of things (TOT) communication protocol, wherein the data received from the group of electronic devices includes data sensed by the sensor.

5. The method of claim 1, wherein the data received from the group of electronic devices includes at least one of membership in the group of electronic devices, a date, location, and a time.

6. The method of claim 1, further comprising authenticating that the sending electronic device is authorized to receive the data received from the group of electronic devices.

7. The method of claim 1, further comprising identifying that the sending electronic device is designated as a leader device.

8. The method of claim 7, further comprising forwarding a command received from the designated leader device.

9. The method of claim 1, wherein the indicated event is an emergency event, and wherein the analysis results correspond to the emergency event.

10. The method of claim 1, further comprising providing the sending electronic device with one or more images, video, audio, or location information associated with the indicated event.

11. The method of claim 1, wherein the data stored from each of the group of electronic devices includes metadata.

12. The method of claim 1, further comprising controlling the operation program code sent to the group of electronic devices.

13. A non-transitory computer-readable storage medium having embodied thereon a program executable by a processor to implement a method for collecting information from electronic devices, the method comprising:
sending operation program code to a group of electronic devices to share sensor and media data according to a data distribution rule;
storing data sets received from each of the group of electronic devices according to the data distribution rule, each data set identifying which electronic device provided respective portions of the data sets, wherein one or more of the data sets includes the sensor and media data;
receiving a communication indicative of an event from a sending one of the electronic devices;
initiating an analysis based on the received communication, the analysis evaluating the sensor and media data included in the one or more data sets, wherein analysis results of the analysis identify that a portion of the sensor and media data is associated with the event indicated by the received communication; and
triggering a function based on the analysis results, wherein the triggered function includes providing the analysis results to one or more other electronic devices that are part of the group of electronic devices.

14. The non-transitory computer-readable storage medium of claim 13, the program further executable to:
identify that at least one of the other electronic devices of the group of electronic devices cannot communicate via a first communication channel; and
identify a second communication channel associated with the at least one electronic device, wherein the analysis results are provided to the at least one electronic device via the identified second communication channel.

15. The non-transitory computer-readable storage medium of claim 13, the program further executable to:
identify that at least one of the other electronic devices of the group cannot communicate via a first communication channel; and
send a communication to the at least one electronic device, the communication indicating that information relating to that event is to be forwarded to the at least one electronic device via a second communication channel.

16. The non-transitory computer-readable storage medium of claim 13, the program further executable to identify that the group of electronic devices is configured to communicate with a sensor in accordance with a specified Internet of things (TOT) communication protocol, wherein the data received from the group of electronic devices includes data sensed by the sensor.

17. The non-transitory computer-readable storage medium of claim 13, wherein the data received from the group of electronic devices includes at least one of membership in the group of electronic devices, a date, location, and a time.

18. The non-transitory computer-readable storage medium of claim 13, the program further executable to perform an authentication that the sending electronic device is authorized to receive the data received from the group of electronic devices.

19. The non-transitory computer-readable storage medium of claim 13, the program further executable to identify that the sending electronic device is designated as a leader device.

20. The non-transitory computer-readable storage medium of claim 13, the program further executable to forward a command received from the designated leader device.

21. The non-transitory computer-readable storage medium of claim 13, wherein the indicated event is an emergency event, and wherein the analysis results correspond to the emergency event.

22. A system for collecting information from electronic devices, the system comprising:
a set of electronic devices that,
received operation program code to share sensor and media data according to a data distribution rule;
store data sets received from each of the group of electronic devices are according to the data distribution rule, each data set identifying which electronic device provided respective portions of the data sets, wherein one or more of the data sets includes the sensor and media data;

receive a communication indicative of an event from a sending one of the electronic devices;

initiate an analysis, the analysis evaluating the sensor and media data included in the one or more data sets, wherein analysis results of the analysis identify that a portion of the sensor and media data is associated with the event indicated by the received communication; and trigger a function based on the analysis results, wherein the triggered function includes providing the analysis results to one or more other electronic devices that are part of the group of electronic devices.

\* \* \* \* \*